United States Patent
Grandhi

(10) Patent No.: US 10,375,596 B2
(45) Date of Patent: *Aug. 6, 2019

(54) GROUP TRANSMISSIONS IN WIRELESS LOCAL AREA NETWORKS

(71) Applicant: InterDigital Patent Holdings, Inc., Wilmington, DE (US)

(72) Inventor: Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,123

(22) Filed: Sep. 24, 2018

(65) Prior Publication Data

US 2019/0028915 A1    Jan. 24, 2019

Related U.S. Application Data

(63) Continuation of application No. 15/404,920, filed on Jan. 12, 2017, now Pat. No. 10,085,168, which is a
(Continued)

(51) Int. Cl.
*H04W 24/10* (2009.01)
*H04W 4/06* (2009.01)
(Continued)

(52) U.S. Cl.
CPC .......... *H04W 24/10* (2013.01); *H04B 7/0452* (2013.01); *H04L 5/0048* (2013.01);
(Continued)

(58) Field of Classification Search
None
See application file for complete search history.

(56) References Cited

U.S. PATENT DOCUMENTS

| 7,701,920 B2 | 4/2010 | Takano |
| 8,406,213 B2 | 3/2013 | Sakoda et al. |

(Continued)

FOREIGN PATENT DOCUMENTS

| CN | 101388841 | 3/2009 |
| GB | 2 459 399 | 10/2009 |

(Continued)

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac D0.1 (Jan. 2011).

(Continued)

*Primary Examiner* — Chi H Pham
*Assistant Examiner* — Raul Rivas
(74) *Attorney, Agent, or Firm* — Volpe and Koenig, P.C.

(57) ABSTRACT

A method for MU MIMO channel sounding by a STA includes receiving, from an AP, sounding information including an indication of a first STA of a group of STAs to transmit feedback and training symbols. The method further includes receiving, from the AP, a frame addressed to the group of STAs, wherein the frame includes a PHY preamble including group identification information identifying the group of STAs. The group identification information enables another STA not in the group of STAs, that receives the frame, to set its network allocation vector (NAV) timer based on a duration field in the frame. On a condition the STA is a first STA in the order of the group of STAs, a first sounding response frame may be transmitted to the AP, wherein the first sounding response frame includes quan- (Continued)

tized sounding feedback determined from the received training symbols.

18 Claims, 10 Drawing Sheets

Related U.S. Application Data continuation of application No. 13/085,111, filed on Apr. 12, 2011, now Pat. No. 9,585,043.

(60) Provisional application No. 61/323,617, filed on Apr. 13, 2010, provisional application No. 61/332,404, filed on May 7, 2010, provisional application No. 61/334,346, filed on May 13, 2010.

(51) Int. Cl.

| | |
|---|---|
| *H04B 7/0452* | (2017.01) |
| *H04L 5/00* | (2006.01) |
| *H04L 25/02* | (2006.01) |
| *H04L 1/16* | (2006.01) |
| *H04W 84/12* | (2009.01) |
| *H04W 99/00* | (2009.01) |

(52) U.S. Cl.
CPC ........... *H04L 25/0224* (2013.01); *H04W 4/06* (2013.01); *H04L 1/1685* (2013.01); *H04W 84/12* (2013.01); *H04W 99/00* (2013.01)

(56) References Cited

U.S. PATENT DOCUMENTS

| | | | |
|---|---|---|---|
| 8,787,841 B2 | 7/2014 | Ketchum et al. | |
| 8,861,495 B2 | 10/2014 | Kim et al. | |
| 2005/0226273 A1 | 10/2005 | Qian | |
| 2006/0041676 A1 | 2/2006 | Sherman | |
| 2006/0078001 A1 | 4/2006 | Chandra et al. | |
| 2006/0165191 A1 | 7/2006 | Lin et al. | |
| 2006/0252443 A1 | 11/2006 | Sammour et al. | |
| 2007/0076675 A1 | 4/2007 | Chen | |
| 2007/0147284 A1 | 6/2007 | Sammour et al. | |
| 2008/0045153 A1* | 2/2008 | Surineni | H04B 7/0417 455/63.1 |
| 2008/0291873 A1 | 11/2008 | Benveniste | |
| 2009/0252250 A1 | 10/2009 | Heath, Jr. et al. | |
| 2009/0290563 A1* | 11/2009 | Gu | H04B 7/0608 370/338 |
| 2010/0046457 A1 | 2/2010 | Abraham et al. | |
| 2010/0248635 A1 | 9/2010 | Zhang et al. | |
| 2011/0032875 A1 | 2/2011 | Erceg et al. | |
| 2011/0116487 A1 | 5/2011 | Grandhi | |
| 2011/0149941 A1* | 6/2011 | Gong | H04B 7/0634 370/343 |
| 2011/0199946 A1 | 8/2011 | Breit et al. | |
| 2012/0039257 A1 | 2/2012 | Morioka et al. | |

FOREIGN PATENT DOCUMENTS

| | | |
|---|---|---|
| WO | 05/004500 | 1/2005 |
| WO | 09/026770 | 3/2009 |
| WO | 09/027931 | 3/2009 |
| WO | 09/147570 | 12/2009 |
| WO | 11/035204 | 3/2011 |
| WO | 11/050324 | 4/2011 |
| WO | 11/068985 | 6/2011 |

OTHER PUBLICATIONS

Draft Standard for Information technology—Telecommunications and information exchange between systems—Local and metropolitan area networks—Specific requirements; Part 11: Wireless LAN Medium Access Control (MAC) and Physical Layer (PHY) specifications; Amendment 7: Extensions to Direct Link Setup (DLS), IEEE P802.11z D 8.0 (Apr. 2010).

Gong et al., "DL MU MIMO Error Handling and Simulation Results," IEEE 802.11-10/0324r1 (Mar. 2010).

IEEE P802.11aa/D0.03, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 8: MAC Enhancements for Robust Audio Video Streaming, IEEE P802.11aa/D0.03 (Jan. 2010).

IEEE P802.11ad/D1.2, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput in the 60 GHz Band, IEEE P802.11ad/D1.2 (Mar. 2011).

IEEE Standard for Information technology—Telecommunications and information exchange between systems—Local and metropolitan area networks—Specific requirements; Part 11: Wireless LAN Medium Access Control (MAC) and Physical Layer (PHY) specifications: Amendment: Medium Access Control (MAC) Quality of Service (QoS) Enhancements, IEEE P802.11e D13.0 (Jan. 2005).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Information technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11, 1999 Edition (Mar. 18, 1999).

Kim et al., "Considerations on MU-MIMO Protection in 11ac," IEEE 802.11-10/0335r1 (Mar. 2010).

Kim et al., "GroupID Concept for Downlink MU-MIMO Transmission," IEEE 802.11-10/0073r0 (Jan. 2010).

Morioka et al., "SDMA operation within 802.11," IEEE 802.11-09/xxxxr0 (May 2009).

* cited by examiner

GROUP TRANSMISSIONS IN WIRELESS LOCAL AREA NETWORKS

CROSS REFERENCE TO RELATED APPLICATIONS

This application is a continuation of U.S. application Ser. No. 15/404,920 which was filed on Jan. 12, 2017, which is a continuation of U.S. application Ser. No. 13/085,111, which was filed on Apr. 12, 2011, which issued as U.S. Pat. No. 9,585,043 on Feb. 28, 2017, which claims the benefit of U.S. Provisional Application No. 61/323,617, filed on Apr. 13, 2010; U.S. Provisional Application No. 61/332,404, filed on May 7, 2010; and U.S. Provisional Application No. 61/334,346, filed on May 13, 2010, the contents of which are hereby incorporated by reference herein.

BACKGROUND

A wireless local area network (WLAN) in infrastructure basic service set (BSS) mode has an access point (AP) for the BSS and one or more stations (STAs) associated with the AP. The AP typically has access or interface to a distribution system (DS) or another type of wired or wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations.

Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with a direct link setup (DLS) using an IEEE 802.11e DLS or an IEEE 802.11z tunneled DLS (TDLS). A WLAN in independent BSS mode has no AP, and the STAs communicate directly with each other.

A network allocation vector (NAV) protection mechanism is used at the medium access control (MAC) layer to protect packet transmissions on the wireless medium. The NAV is an indicator maintained by each device (i.e., the STA or the AP) of time periods when transmission onto the wireless medium will not be initiated by the device. Each frame transmitted in the BSS contains a duration field that is set to a time period corresponding to the transmission of the frame and any subsequent frames, along with interframe spaces as required by the frame exchange sequences defined in the MAC layer protocol. A device that receives a valid frame not addressed to it updates its NAV using the information in the duration field of the received frame if the update results in a new NAV value that is greater than the current NAV value.

In a BSS, packet collisions may result because of hidden node problems. To mitigate this problem, a ready to send (RTS) and clear to send (CTS) frame exchange may be used to set the NAV. To reserve the medium, a device sends an RTS frame addressed to a recipient device as the first frame of a frame exchange sequence. The recipient device responds with a CTS frame addressed to the device that transmitted the RTS frame. In this way, the NAV is set for all other STAs in the neighborhoods of both devices to support the frame exchange sequence.

Another protection mechanism that involves less overhead, but is not as robust, is transmission of a "CTS-to-self" frame before a transmission requiring protection. With this protection mechanism, a device first transmits a CTS frame addressed to itself with a duration value that protects the subsequent transmission.

Devices may be assigned to groups with a group identifier (referred to hereinafter as group ID) using management frames for radio resource management functions. The group ID and associated group information is indicated in the physical (PHY) or MAC portion of a frame. Methods are known for assigning a group ID with associated group parameters to devices using management frames.

WLANs with very high throughput (VHT) of greater than 100 Mbps on top of the MAC layer are being designed. To enhance system performance, VHT WLANs may include features such as: power saving, MU-MIMO, or orthogonal frequency division multiple access (OFDMA). These features may use group transmissions or group frame exchanges, in which more than two devices are involved.

In a MU-MIMO or OFDMA scenario, a given device communicates with more than one STA simultaneously, resulting in multiple simultaneous communication links. With MU-MIMO, the simultaneous communications occur on the same frequency or frequencies. With OFDMA, the simultaneous communications occur on different allocated sub-carrier frequencies. In the uplink (UL) direction (to the device), there is more than one transmitting device and one receiving device. In the downlink (DL) direction (from the device), there is one transmitting device and more than one receiving device.

Because more than two devices are involved in group transmissions or group frame exchanges, the existing protection mechanisms of RTS and CTS frame exchanges (which are designed for only two devices) will not work properly. Similarly, frame response mechanisms such as acknowledgement (ACK) frames and block ACK frames (which are designed for only two devices) will not work properly for group transmissions or group frame exchanges.

For group transmissions or group frame exchanges, the group ID concept described above may be used to provide a signaling protection mechanism, a frame response mechanism, and a sounding mechanism.

SUMMARY

A method for channel sounding by an access point includes transmitting a sounding frame to a plurality of mobile stations (STAs). The sounding frame includes training symbols to be measured by each of the plurality of STAs. A sounding response frame is received from each of the plurality of STAs. The sounding response frame received from a first STA of the plurality of STAs is received at a short interframe spacing interval delay after completion of the sounding request frame transmission.

An access point (AP) includes a processor, a transmitter, and a receiver. The processor is configured to generate a sounding frame to sound a channel between the AP and a plurality of STAs. The sounding frame includes training symbols to be measured by each STA of the plurality of STAs. The transmitter is configured to transmit the sounding frame to the plurality of STAs. The receiver is configured to receive a sounding response frame from each of the plurality of STAs. The sounding response frame received from a first STA of the plurality of STAs is received at a delay of a short interframe spacing interval after transmitting the sounding frame.

A method for channel sounding by a STA includes receiving a sounding frame from an AP. The sounding frame includes training symbols to be measured by the STA. On a condition that the sounding frame includes an address of the STA, the STA sends a sounding response frame to the AP. On a condition that the sounding frame does not include an address of the STA, the STA sets a network allocation vector based on information included in the sounding frame.

A STA includes a receiver, a processor, and a transmitter. The receiver is configured to receive a sounding frame from an AP. The sounding frame includes training symbols to be measured by the STA. The processor is configured to process the sounding frame to determine whether the sounding frame includes an address of the STA and set a network allocation vector based on information included in the sounding frame on a condition that the sounding frame does not include an address of the STA. The transmitter is configured to transmit a sounding response frame to the AP on a condition that the sounding frame includes an address of the STA.

A method for MU MIMO channel sounding by a STA includes receiving, from an AP, sounding information including an indication of a first STA of a group of STAs to transmit feedback and training symbols. The method further includes receiving, from the AP, a frame addressed to the group of STAs, wherein the frame includes a PHY preamble including group identification information identifying the group of STAs. The group identification information enables another STA not in the group of STAs, that receives the frame, to set its network allocation vector (NAV) timer based on a duration field in the frame. On a condition the STA is a first STA in the order of the group of STAs, a first sounding response frame may be transmitted to the AP, wherein the first sounding response frame includes quantized sounding feedback determined from the received training symbols.

BRIEF DESCRIPTION OF THE DRAWINGS

A more detailed understanding may be had from the following description, given by way of example in conjunction with the accompanying drawings, wherein.

DETAILED DESCRIPTION

Figure 1A:
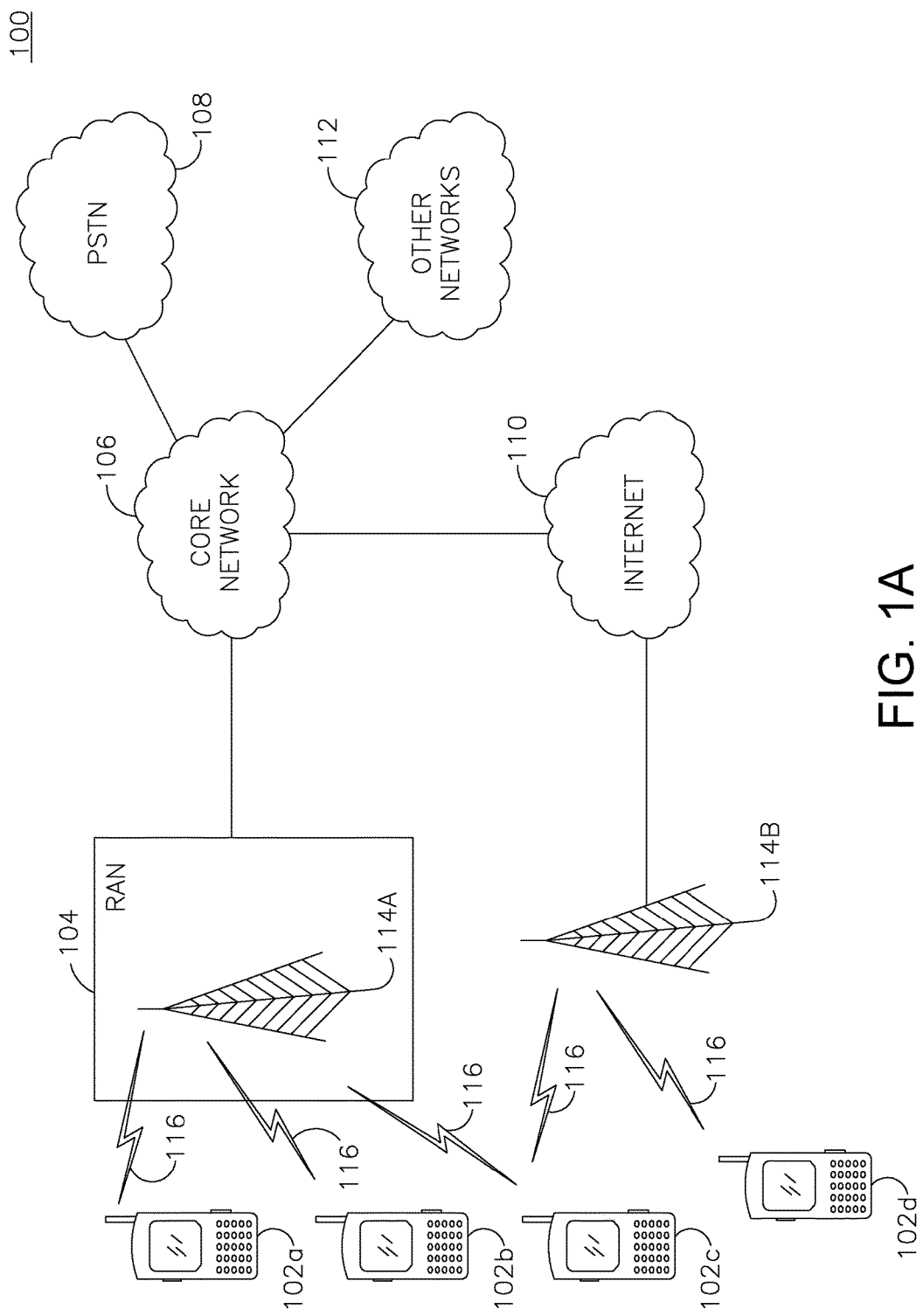
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband_ CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
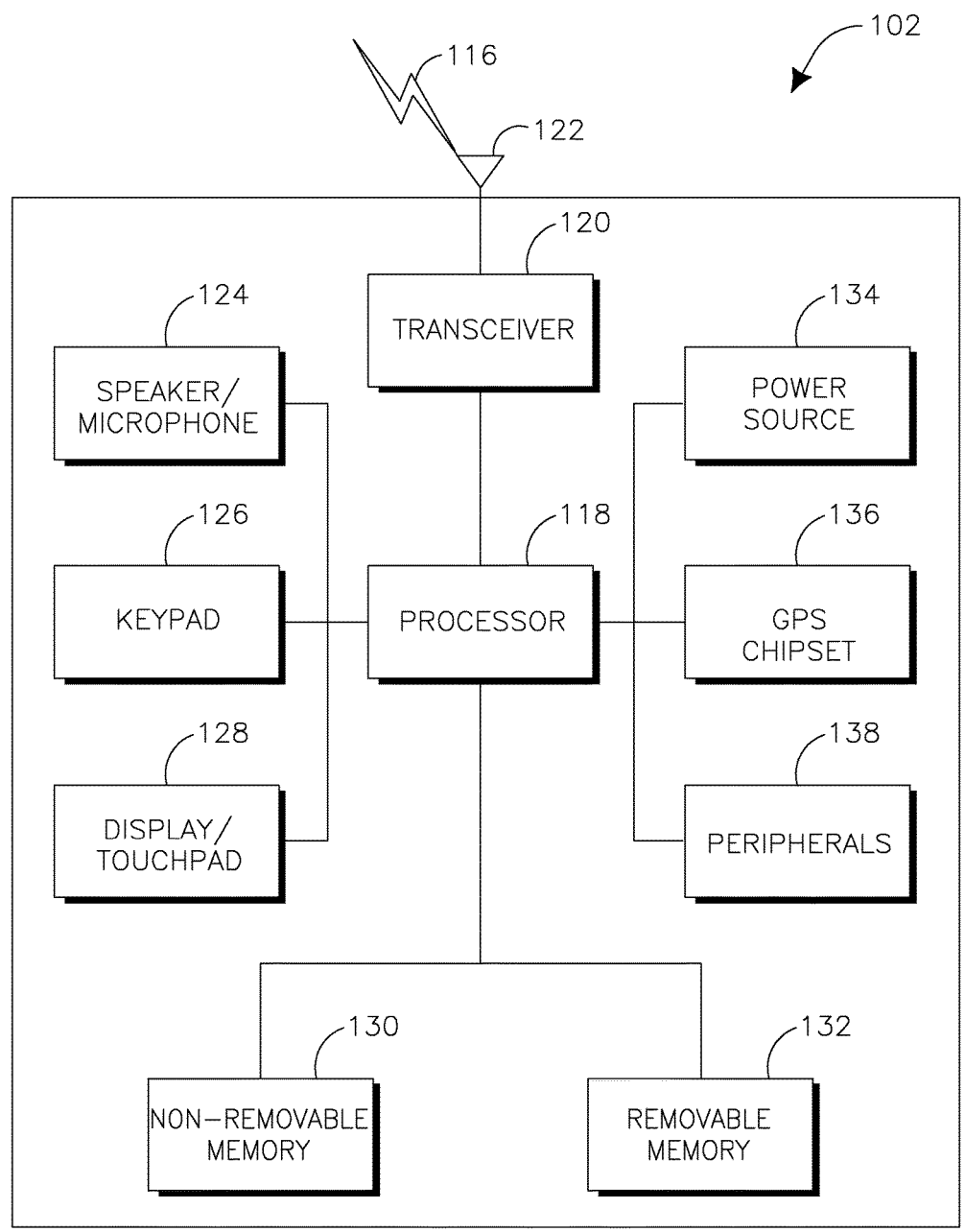
FIG. 1B is a system diagram of an example wireless transmit/receive unit (WTRU) or station (STA) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be configured to perform any of the methods described below.

The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
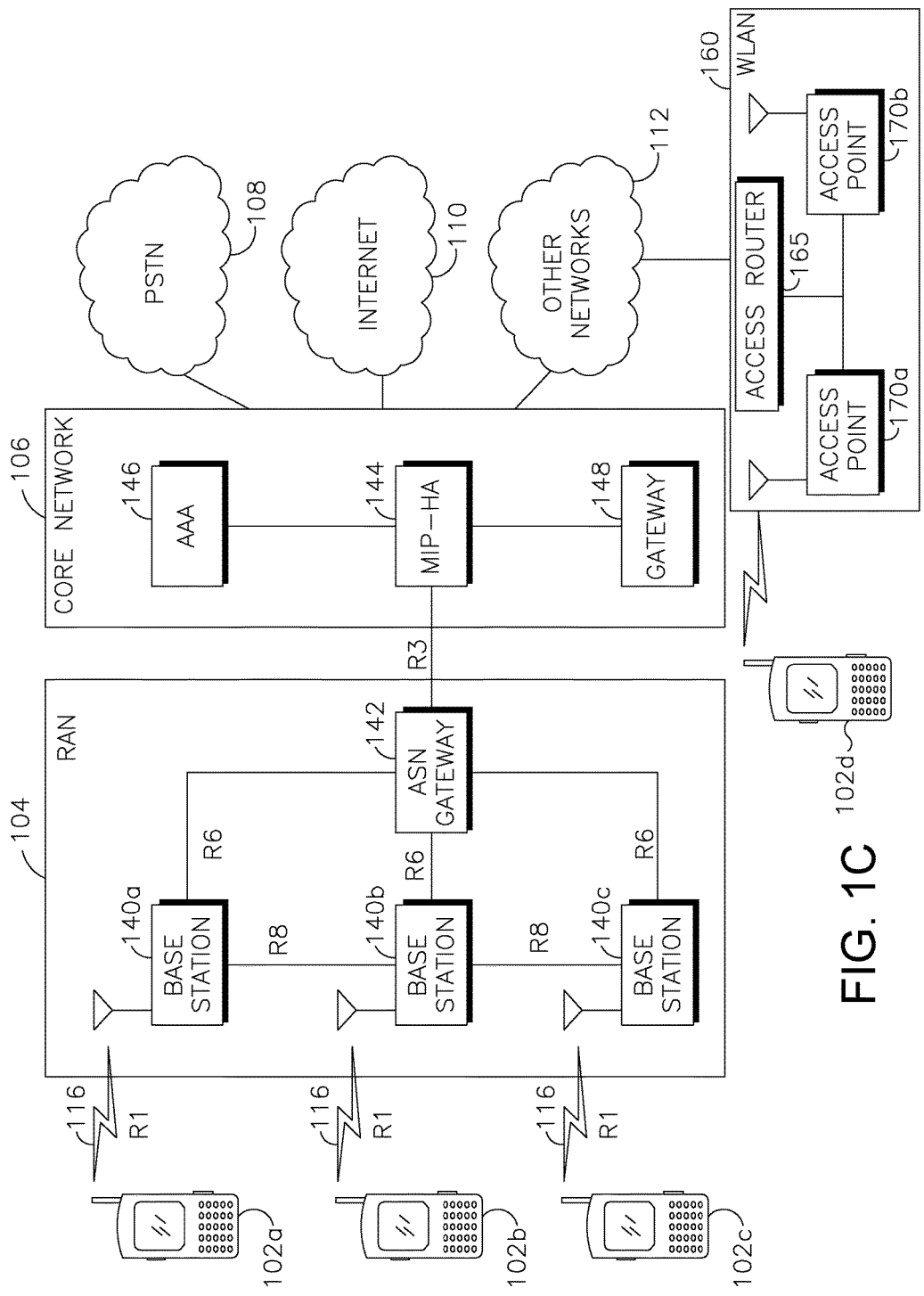
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

The other networks 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards) or any type of wireless communication protocol. The AP 170a is in wireless communication over an air interface with the WTRU 102d. The APs 170a, 170b may be configured to perform any of the methods described below.

Group ID for Group Frame Exchange

The devices in a group may be a mix of legacy and new devices; a mix of devices that support different data rate, code, modulation, or transmission schemes (e.g., space-time block coding (STBC) and non-STBC); or devices that are not legacy devices.

When using a group ID, STAs are assigned to a group and are attributed certain group features. The group ID information includes one or more of: a group identification which identifies the group; an address or identifier for each device belonging to the group; an address or identifier for each device belonging to the group that may be recognizable by all the other devices belonging the group; group characteristics, properties, or rules; an order, sequence, or schedule of the group members; or allocation of OFDMA sub-carrier frequencies.

The term "order of the group members" (or "order") also includes a sequence of the group members or a schedule of the group members. The order of the group members may be specified in any of the following ways: order or sequence information indicating an ascending or descending order; timing information, e.g., a transmission time with respect to a reference time; allocation of frequencies to devices for transmission or reception (e.g., OFDMA sub-carrier frequencies); explicitly specified along with the group ID; implicitly associated with the group ID and specified elsewhere, e.g., with a management frame, control frame, or data frame exchange; or implicitly derived from the group ID using a specified rule or procedure.

Devices to be engaged in a group transmission or group frame exchange are assigned to a group with a group ID. A device may be assigned to or belong to more than one group. The group ID assignment may be made using a data frame, a control frame, or a management frame.

The group ID may be included in any MAC frame field. For example, the group ID may be included in a MAC address field in any data frame, control frame, or management frame for group frame exchange, group management, or group control purposes. For example, the group ID may be included in one or more of the following MAC address fields: transmitting STA address (TA), receiving STA address (RA), source address (SA), or destination address (DA).

The interframe spacing (IFS) between the frames in any of the frame exchange sequences described below may be set or designed as appropriate for system implementation. For example, the IFS in the frame exchange sequences may be set as any of the following time intervals: a multiple of a slot time, Reduced IFS (RIFS), a multiple of RIFS, Short IFS (SIFS), a multiple of SIFS, Point Coordination Function IFS (PIFS), or a multiple of PIFS.

It is noted that although the following embodiments may be described in connection with DL MU-MIMO, DL OFDMA, or DL group transmission, these embodiments may also be applicable to UL MU-MIMO, UL OFDMA, or UL group frame exchange. The following embodiments may be applied to all group transmissions where more than two devices are involved in packet transmissions or frame exchange (e.g., MU-MIMO, Power Saving), although some of the embodiments may be described in terms of MU-MIMO or OFDMA transmissions.

RTS and CTS for Group Frame Exchange

To reserve the medium for a group frame exchange, a device may send an RTS frame (including the group ID) addressed to the group as the first frame of a frame exchange sequence. Any device not associated with the group ID that receives the RTS frame sets its NAV based on the duration field in the RTS frame.

In response to the RTS frame, a recipient device belonging to the group sends a CTS frame addressed to the group ID, in an order with respect to other devices belonging to the group. The order for transmitting CTS frames may be derived by the devices in the group from the order associated with the group ID. Any device not associated with the group ID that receives the CTS frame sets its NAV based on the duration field in the CTS frame. In this way, the NAV may be set for all other devices not belonging to the group ID in the neighborhoods of the devices belonging to the group frame exchange.

A device belonging to the group considers its order associated within the group when setting the duration field of its CTS frame. For example, a device that is second in order for responding with a CTS frame sets the duration field in the CTS frame as the duration value obtained from the RTS frame minus two times the time required to transmit a CTS frame plus its SIFS interval (or other interframe spacing interval).

In general, a device that is Nth in order for responding with a CTS frame sets the duration field in the CTS frame as the duration value obtained from the duration field of the RTS frame minus N×(the time required to transmit a CTS frame+a SIFS interval or other interframe spacing interval) where N is an integer greater than or equal to one. Such an RTS and CTS frame exchange mechanism mitigates the hidden node problem when more than two devices (e.g., one AP and two or more STAs, or three or more STAs) are involved in a group frame exchange sequence. Sending the response frame in sequence has a higher delay in sending the response frames, but has lower system complexity.

Figure 2:
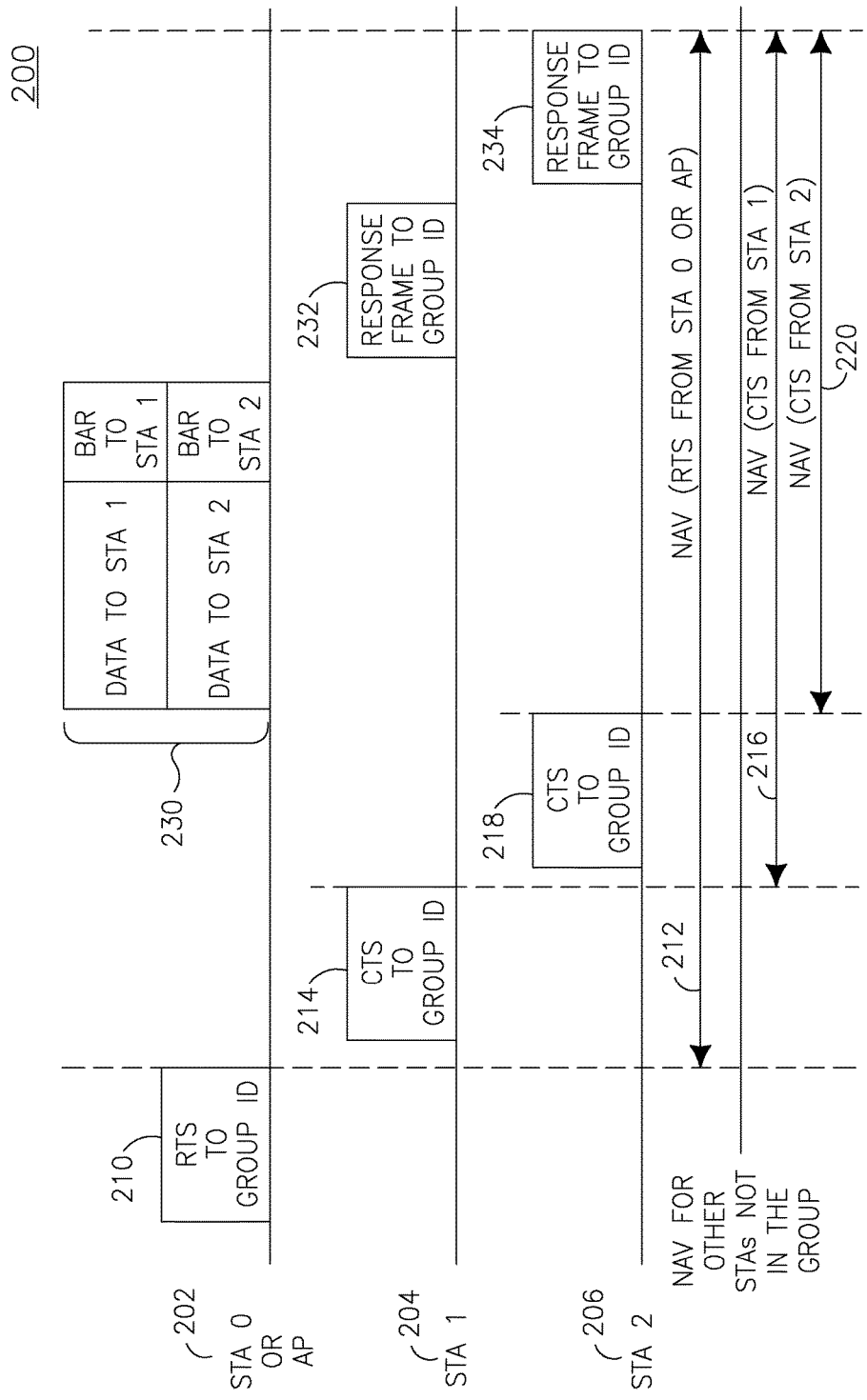
FIG. 2 is a flow diagram of a NAV protection procedure with RTS and CTS frames for a group frame exchange when the response frames are sent in sequence.

FIG. 2 is a flow diagram of a NAV protection procedure 200 with RTS and CTS frames for a group frame exchange when the response frames are sent in sequence. The NAV protection procedure 200 involves an AP or STA0 202 (referred to hereafter as AP 202), a first station STA1 204, and a second station STA2 206. STA1 204 is before STA2 206 in the order associated with the group. It is noted that the procedure 200 will work with any number of stations.

The AP 202 sends a RTS frame addressed to the group by including the group ID in the RA field (step 210). Any STAs not in the group set their NAV based on the duration field in the RTS frame (step 212). STA1 204 responds first with a CTS frame with the RA field containing the group ID (step 214). Any STAs not in the group set their NAV based on the duration field in the CTS frame (step 216), if the new NAV value is longer than the NAV value from the RTS frame or if a STA receiving the CTS frame from STA1 did not receive the RTS frame from AP0.

Then STA2 206 sends a CTS frame with the RA field containing the group ID (step 218). Any STAs not in the group set their NAV based on the duration field in the CTS frame (step 220), if the new NAV value is longer than the NAV value from the RTS frame or from the CTS frame from STA1 204 or if a STA receiving the CTS frame from STA2 did not receive the RTS frame from AP0 or the CTS frame from STA1.

The AP 202 sends a group frame with data and a BAR to STA1 204 and data and a BAR to STA2 206 (step 230). In an OFDMA implementation, the group frame is transmitted to STA1 204 and STA2 206 on their respective allocated frequencies. In a MU-MIMO implementation, the group frame is transmitted to STA1 204 and STA2 206 on the same frequency. Following the same order as with sending the CTS frames, STA1 204 first sends a response frame to the group ID (step 232). Then STA2 206 sends a response frame to the group ID (step 234). The response frame may be a block ACK or other response frame type, depending on the frame exchange protocol used.

Figure 3:
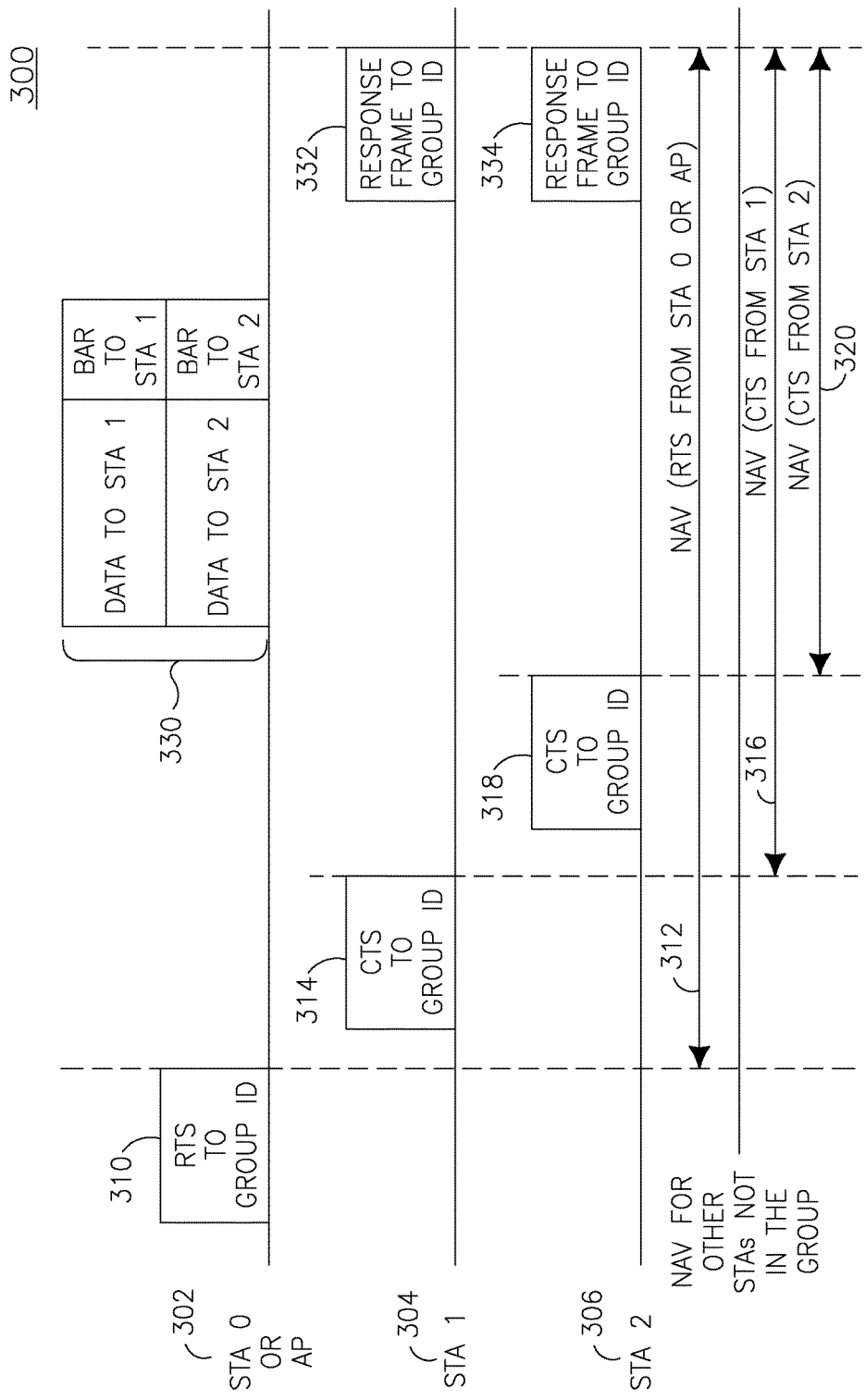
FIG. 3 is a flow diagram of a NAV protection procedure with RTS and CTS frames for a group frame exchange when the response frames are sent at the same time.

FIG. 3 is a flow diagram of a NAV protection procedure 300 with RTS and CTS frames for a group frame exchange when the response frames are sent at the same time. The NAV protection procedure 300 involves an AP or STA0 302 (referred to hereafter as AP 302), a first station STA1 304, and a second station STA2 306. STA1 304 is before STA2 306 in the order associated with the group. It is noted that the procedure 300 will work with any number of stations.

The AP 302 sends a RTS frame addressed to the group by including the group ID in the RA field (step 310). Any STAs not in the group set their NAV based on the duration field in the RTS frame (step 312). STA1 304 responds first with a CTS frame with the RA field containing the group ID (step 314). Any STAs not in the group set their NAV based on the duration field in the CTS frame (step 316), if the new NAV value is longer than the NAV value from the RTS frame or if a STA receiving the CTS frame from STA1 did not receive the RTS frame from AP0.

Then STA2 306 sends a CTS frame with the RA field containing the group ID (step 318). Any STAs not in the group set their NAV based on the duration field in the CTS frame (step 320), if the new NAV value is longer than the NAV value from the RTS frame or from the CTS frame from STA1 304 or if a STA receiving the CTS frame from STA2 did not receive the RTS frame from AP0 or the CTS frame from STA1.

The AP 302 sends a group frame with data and a BAR to STA1 304 and data and a BAR to STA2 306 (step 330). In an OFDMA implementation, the group frame is transmitted to STA1 304 and STA2 306 on their respective allocated frequencies. In a MU-MIMO implementation, the group frame is transmitted to STA1 304 and STA2 306 on the same frequency.

STA1 304 sends a response frame to the group ID (step 332) at the same time that STA2 306 sends a response frame to the group ID (step 334). In an OFDMA implementation, the response frames are transmitted by STA1 304 and STA2 306 on their allocated frequencies. Sending the response frames by STA1 and STA2 at the same time, using MU-MIMO or OFDMA, has a lower delay in sending the response frames, but has a higher system complexity. The response frame may be a block ACK or other response frame type, depending on the frame exchange protocol used.

In the procedures 200 and 300, where the CTS frame addressed to the group ID is sent in response to an RTS in the group frame exchange, a CTS frame addressed to the device transmitting the RTS frame may be used instead, with all the other procedures and rules being the same. The RA field in the CTS frame in this case contains either the special identifier of the device transmitting the RTS frame that may be recognizable by all the devices in the group as part of the group ID, or the MAC address of device that sent the RTS frame.

The RTS frame may include an indication using one or more bits that requires other devices associated with the group ID to respond with CTS frames. In one embodiment, this indication may be in the PHY preamble of the RTS frame.

The RTS frame may carry the group ID information in either the PHY preamble or in MAC layer fields following the MAC address fields. In these scenarios, the RA field of the RTS frame may contain a broadcast ID or a general group ID representing all group transmissions (e.g., MU-MIMO or OFDMA). Also, if the PHY preamble of the RTS frame is modified, then the legacy signal (L-SIG) transmit opportunity (TXOP) protection as defined in IEEE 802.11n may be used for setting the NAV of legacy devices, because the legacy devices may not understand or decode the modified PHY preamble of the RTS frame. Alternatively, a legacy format frame (e.g., CTS to self) may be sent before the RTS frame to set the NAV appropriately.

Figure 4:
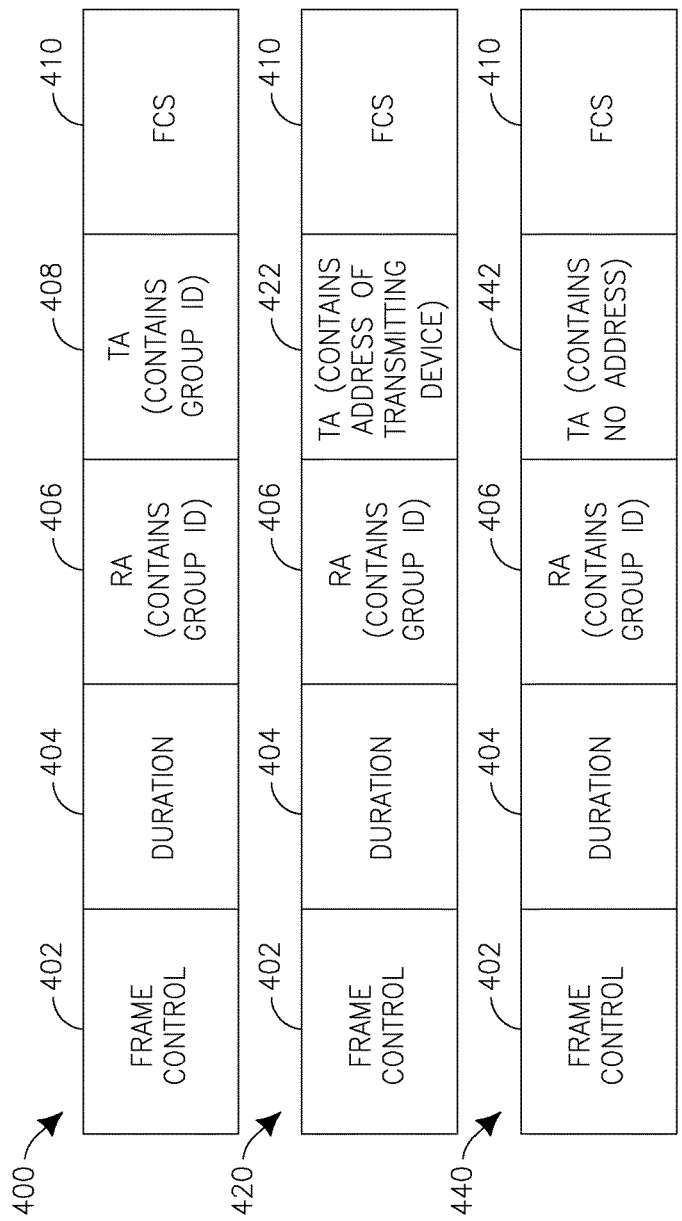
FIG. 4 shows diagrams of three options for an RTS frame format for use in a group frame exchange.

There are three options for the TA field of the RTS frame addressed to a group ID, as shown in FIG. 4. A first option of the RTS frame 400 includes a frame control field 402, a duration field 404, a RA field 406 that includes the group ID, a TA field 408 that includes the group ID, and a frame check sequence (FCS) field 410.

A second option of the RTS frame 420 includes the frame control field 402, the duration field 404, the RA field 406, a TA field 422 that includes the address of the device transmitting the RTS frame, and the FCS field 410.

A third option of the RTS frame 440 includes the frame control field 402, the duration field 404, the RA field 406, a TA field 442 that may be empty or contains no address, and the FCS field 410.

Figure 5:
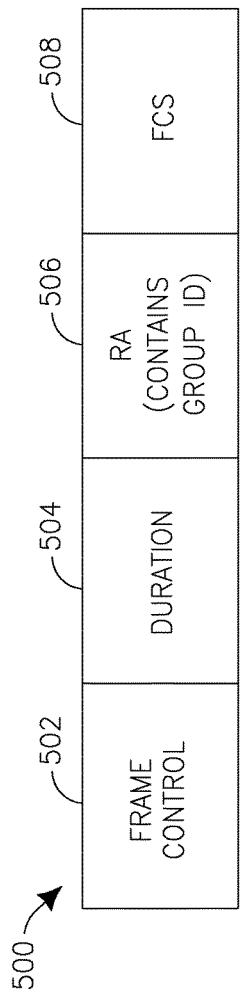
FIG. 5 is a diagram of a CTS frame format for use in a group frame exchange.

FIG. 5 shows a CTS frame 500, including a frame control field 502, a duration field 504, a RA field 506 containing the group ID, and a FCS field 508.

Response Frames in Group Frame Exchange

Devices in the group that received data in the DL group transmission may include the group ID in the RA field of their response frames, such as ACK or block ACK, or any other type of response frame allowed or required by the MAC protocol. The response frames set the NAV of all the devices except the ones belonging to the group. Alternatively, the devices sending the response frames may include the individual MAC address of the intended recipient device (the device that sent the data or other frames, such as BAR, which required these response frames to be sent) in the RA field of their response frames such as ACK or block ACK.

In a first option (e.g., as shown in FIG. 2), the response frames from the responding devices in the group may be sent in a specific order. The order for transmitting the response frames may be derived by the devices in the group from the order information associated with the group ID, or the order information provided by the initiating device in earlier frames. The order information may also be specified as timing information, e.g., a transmission time with respect to a reference time. In a second option (e.g., as shown in FIG. 3), the response frames from the responding devices in the group may be sent at the same time, for example, by using MU-MIMO or OFDMA.

A device belonging to the group considers its order associated with the group in setting the duration field of its response frame, such as ACK or block ACK. In general, the duration fields in the response frames are set to protect the desired group frame exchange sequence.

The responding devices may obtain scheduling information for sending response frames from the group ID information associated with the group members or from the BAR frame sent by the device. The scheduling information for sending response frames may include one or more of: an order, allocated frequencies, or time information. The time information may include the time to begin transmission or information from which the time to begin transmission may be derived.

In general, a device that is Nth in order for responding with an ACK frame to an initiating device transmits an ACK frame at a delay of (N−1) times the time required to transmit an ACK frame plus N times a SIFS interval (or other interframe spacing interval), after the frame from the initiating device to which the ACK frame is a response. In other words, the delay in ACK frame transmission of a responding device which is Nth in order for responding is (N−1)×(transmit time of an ACK frame)+N×(SIFS or other interframe spacing interval), where N is an integer value greater than or equal to one.

CTS to Group ID for Group Frame Exchange

To reserve the medium for a group frame exchange, a device may send a CTS frame addressed to the group ID as the first frame of a frame exchange sequence. Any device not associated with the group ID that receives the CTS frame sets its NAV based on the duration field of the CTS frame. In this way, the NAV may be set for all other devices not belonging to the group in the neighborhoods of the devices belonging to the group frame exchange.

The device may optionally send the CTS to group ID frame more than once sequentially, to increase the chance that all devices in the BSS receive it. The number of repetitions of sending the CTS to group ID frame may be an operational system parameter. The CTS to group ID mechanism mitigates the hidden node problem when more than two devices (e.g., one AP and two or more STAs, or three or more STAs) are involved in a group frame exchange sequence.

Figure 6:
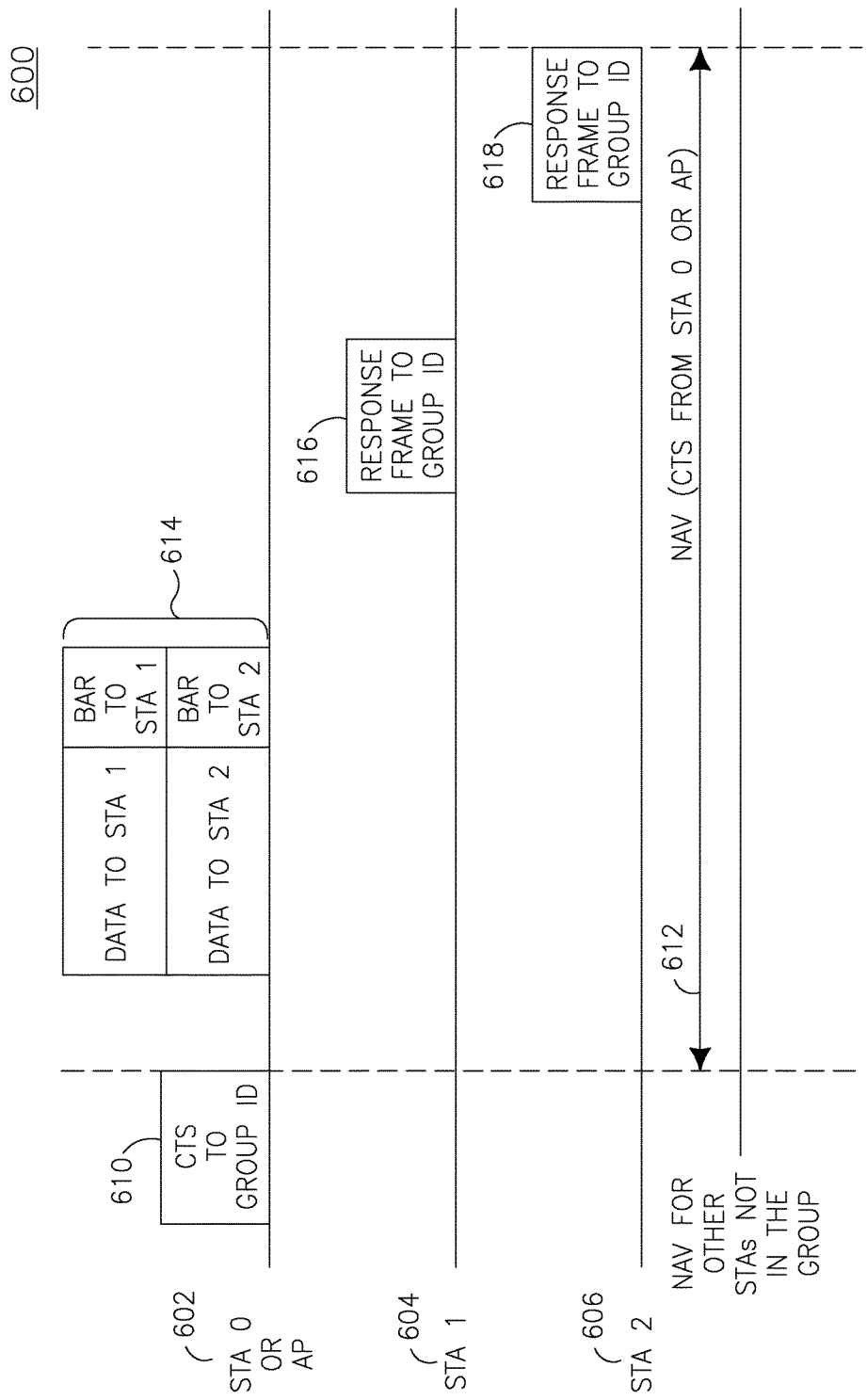
FIG. 6 is a flow diagram of a NAV protection procedure with a CTS frame sent to a group ID for a group frame exchange when the response frames are sent in sequence.

FIG. 6 is a flow diagram of a NAV protection procedure 600 with a CTS frame sent to a group ID for a group frame exchange when the response frames are sent in sequence. The NAV protection procedure 600 involves an AP or STA0 602 (referred to hereafter as AP 602), a first station STA1 604, and a second station STA2 606. STA1 604 is before STA2 606 in the order associated with the group. It is noted that the procedure 600 will work with any number of stations.

The AP 602 sends a CTS frame addressed to the group by including the group ID in the RA field (step 610). Any STAs not in the group set their NAV based on the duration field in the CTS frame (step 612).

The AP 602 sends a group frame with data and a BAR to STA1 604 and data and a BAR to STA2 606 (step 614). In an OFDMA implementation, the group frame is transmitted to STA1 604 and STA2 606 on their respective allocated frequencies. In a MU-MIMO implementation, the group frame is transmitted to STA1 604 and STA2 606 on the same frequency.

The STA1 604 sends a response frame to the group ID (step 616). Then STA2 606 sends a response frame to the group ID (step 618). Sending the response frame in sequence has a higher delay in sending the response frames, but has lower system complexity. The response frame may be a block ACK or other response frame type, depending on the frame exchange protocol used.

Figure 7:
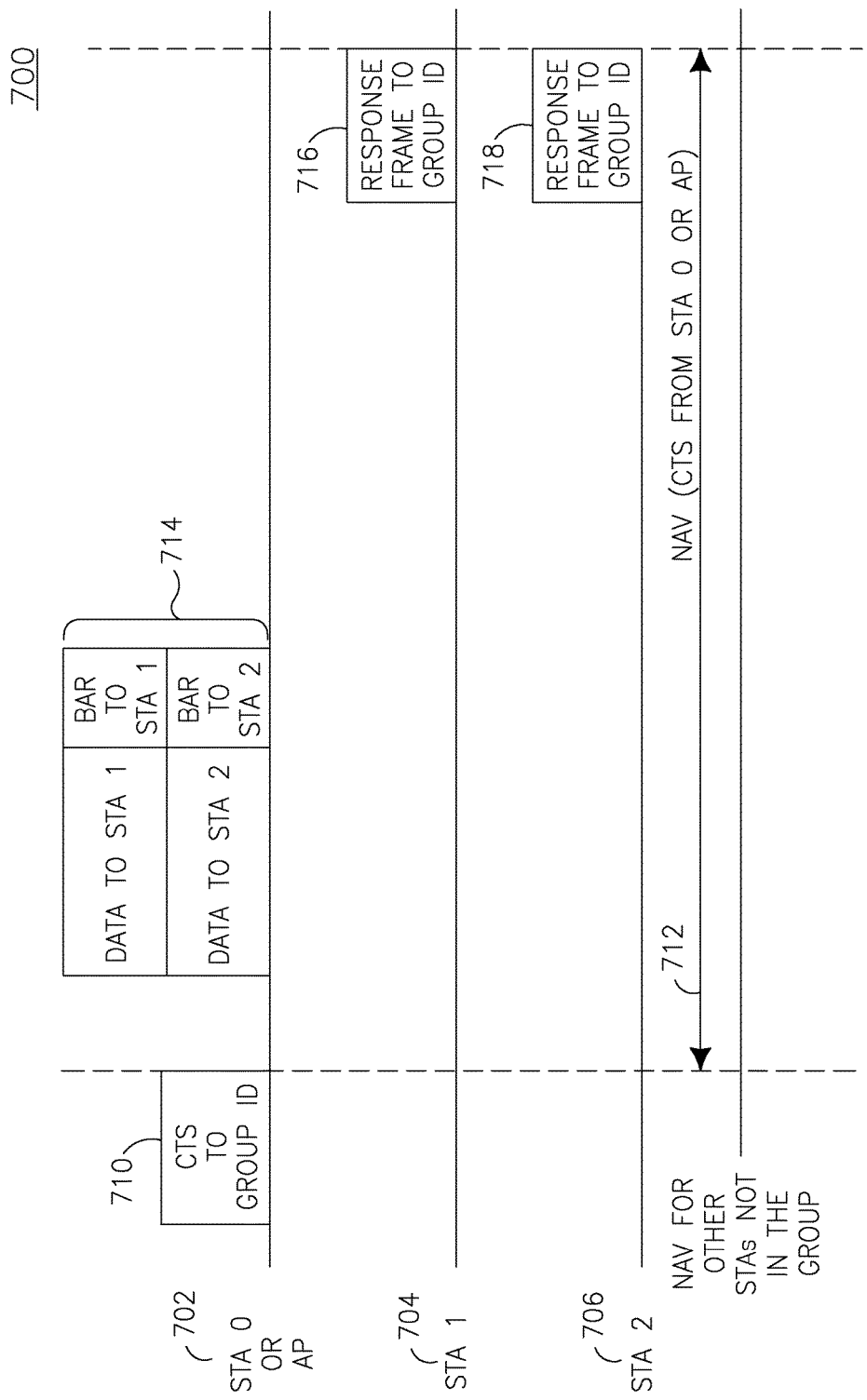
FIG. 7 is a flow diagram of a NAV protection procedure with a CTS frame sent to a group ID for a group frame exchange when the response frames are sent at the same time.

FIG. 7 is a flow diagram of a NAV protection procedure 700 with a CTS frame sent to a group ID for a group frame exchange when the response frames are sent at the same time. The NAV protection procedure 700 involves an AP or STA0 702 (referred to hereafter as AP 702), a first station STA1 704, and a second station STA2 706. STA1 704 is before STA2 706 in the order associated with the group. It is noted that the procedure 700 will work with any number of stations.

The AP 702 sends a CTS frame addressed to the group by including the group ID in the RA field (step 710). Any STAs not in the group set their NAV based on the duration field in the CTS frame (step 712).

The AP 702 sends a group frame with data and a BAR to STA1 704 and data and a BAR to STA2 706 (step 714). In an OFDMA implementation, the group frame is transmitted to STA1 704 and STA2 706 on their respective allocated frequencies. In a MU-MIMO implementation, the group frame is transmitted to STA1 704 and STA2 706 on the same frequency.

STA1 704 sends a response frame to the group ID (step 716) at the same time that STA2 706 sends a response frame to the group ID (step 718). In an OFDMA implementation, the response frames are transmitted by STA1 704 and STA2 706 on their allocated frequencies. Sending the response frames by STA1 and STA2 at the same time, using MU-MIMO or OFDMA, has a lower delay in sending the response frames, but has a higher system complexity. The response frame may be a block ACK or other response frame type, depending on the frame exchange protocol used.

In the procedures 600 and 700, where the CTS frame with an RA field containing the group ID is the first packet transmission by a device in a frame exchange sequence, a CTS frame addressed to the device transmitting the CTS frame (i.e., addressed to self) may be used instead, with all the other procedures and rules being the same. The address or identifier used by the device in the RA field of the CTS to represent itself may be the device's MAC address, a newly defined address or identifier that is recognizable by all the other devices belonging the group, or an existing address or identifier that is recognizable by the other devices belonging the group.

Error Recovery in Group Frame Exchange

If a device sends an RTS to group ID frame and does not receive one or more expected CTS frames from the devices in the group, there may be an error. The device may recover from the error by attempting to reclaim the wireless medium or by ignoring the CTS failure.

The device may attempt to reclaim the wireless medium as soon as it detects a failure of an expected CTS reception, after sensing the channel as idle for a certain duration, e.g., PIFS. The device may then restart the procedure by sending the RTS to group ID frame or starting a CTS to group ID NAV protection procedure.

Alternatively, the device waits for the last CTS frame from the group and then attempts to reclaim the wireless medium after sensing the channel as idle for a certain duration, e.g., PIFS. The device then restarts the procedure by sending the RTS to group ID frame or starting a CTS to group ID NAV protection procedure.

The device may ignore the failure of an expected CTS frame reception and continue as if the expected CTS frame was received.

Due to poor communication links, BAR and BA frames may be not be successfully received by the intended recipient devices. If the initiating device does not receive an expected BA frame from a responding device, it may retransmit an updated BAR frame with the latest information to that responding device.

In one option, after the device senses the medium as being idle for a specified period of time after the BA response is expected, the device may retransmit the updated BAR frame if there is enough time remaining in the TXOP of the device. In a second option, the device may retransmit the updated BAR frame in a new transmission opportunity obtained after the completion of the current group frame exchange or group transmission.

Special Notes on Preceding Embodiments

The RTS and CTS frame exchange mechanisms as described above may be applied on all frequency channels, e.g., the primary channel and the secondary channels of an 802.11 BSS. For example, the RTS and CTS frame exchange mechanism may be repeated in each 20 MHz channel used by the system or BSS. This may be useful when there are both 20 MHz and 40 MHz capable devices in operation. Alternatively, if all of the devices operating in the system have a common bandwidth (e.g., 20 MHz, 40 MHz, or 80 MHz), then the RTS and CTS frame exchange mechanism may be carried out once in the common bandwidth.

The AP and STAs may indicate the capability to support one or more aspects of the communication mechanisms for group transmissions using one or more bits in any new or existing frames. For example, the indicator may be used in management frames such as association request, association response, re-association request, re-association response, probe request, probe response, beacon, or secondary or auxiliary beacon frames. In one embodiment, this capability indication may be included in a VHT capability information element which may be included in any of the above-listed frames.

It is noted that although the above embodiments for group transmissions have been described in terms of the RTS and CTS frames, these embodiments are applicable to any other data frame, management frame, or control frame that serves the same or a similar purpose or exhibits the same or similar functionality of the RTS and CTS frames. For example, the RTS frame may be replaced by a different frame (e.g., a newly defined Initiator Control frame) that exhibits the same or a similar functionality of the RTS frame. Similarly, the CTS frame may be replaced by a different frame (e.g., a newly defined Responder Control frame) that exhibits the same or a similar functionality of the CTS frame.

Sounding for Group Frame Exchange

A channel sounding mechanism may be used to obtain as full a characterization or estimate of the channel as possible in a group transmission scenario, such as MU-MIMO. Even when MU-MIMO is not used, acquiring knowledge of the channel by a device using sounding mechanisms prior to transmission allows performance optimization for single antenna or multiple antenna systems. One example of this type of sounding mechanism includes a scenario where no MU-MIMO is used, but OFDMA is used in group transmissions.

When using MIMO techniques, the beamformer device (AP or STA) calculates the appropriate steering or beamforming parameters based on an estimate of the transmission channel. This calculation of steering or beamforming parameters may use implicit or explicit feedback mechanisms with the beamformee device.

In the implicit feedback mechanism, the beamformer sends a training request to the beamformees in the group frame exchange. Each beamformee responds with training symbols in a sounding packet or frame, which allows the beamformer to estimate the channel. The channel estimate allows the beamformer to calculate appropriate steering or beamforming parameters, on the assumption that the channel is reciprocal; typically, calibration of radios is used to improve reciprocity. The order in which beamformees in the group frame exchange transmit the sounding frames is determined by the order associated with the group frame exchange or group ID.

In the explicit feedback mechanism, the beamformer device sends training symbols in a sounding frame to the beamformees in the group frame exchange, which allows each beamformee device to estimate the channel. A beamformee device responds, including information on the channel estimate (which may be quantized or modified for feedback) in a sounding response frame. The feedback information on the channel estimate allows the beamformer to calculate appropriate steering or beamforming parameters. The order in which beamformees in the group frame exchange transmit the sounding response frames is determined by the order associated with the group frame exchange or group ID.

Sounding with Implicit Feedback for Group Frame Exchange

In an implicit feedback mechanism, the beamformer device sends a sounding request to all the beamformee devices. The beamformee devices reply to the sounding request with training symbols, in the form of a sounding packet or frame. The sounding frame includes a sufficient number of training symbols or fields in the preamble portion to sound the full dimensionality of the channel. One or more bits in the preamble may be used to indicate whether the packet is a sounding frame. The sounding request frame may contain scheduling information for the sounding frames from the beamformees. The sounding request frame and the sounding frame may be any data frame, management frame, or control frame.

The sounding request frame in the group frame exchange includes a sounding or training request and is addressed to all the beamformee devices associated with the group ID. The training request may be included in a VHT control field sent with the sounding request frame. When a beamformee in the group receives a sounding request frame with a training request, the beamformee responds with a sounding frame. The sounding frame includes training symbols for the beamformer.

The order for transmitting sounding frames may be derived by the beamformee devices in the group from the order information associated with the group ID or the order information provided by the beamforming device in earlier frames (e.g., in the sounding request frame). The sequence of sounding frames may be sent immediately or delayed. When sent immediately, the sounding frame follows the sounding request frame from the beamformer at a delay of a SIFS interval (or other interframe spacing interval). When sent delayed, the sounding frame is sent at a delay of more than a SIFS interval (or other interframe spacing interval) after the sounding request frame from the beamformer.

The interframe spacing (IFS) between the frames (e.g., sounding request, sounding, or sounding response) in the frame exchange sequences may be set or designed as appropriate for system implementation. For example, the IFS may be set as any of the following: a multiple of a slot time, RIFS, a multiple of RIFS, SIFS, a multiple of SIFS, PIFS, or a multiple of PIFS.

Figure 8:
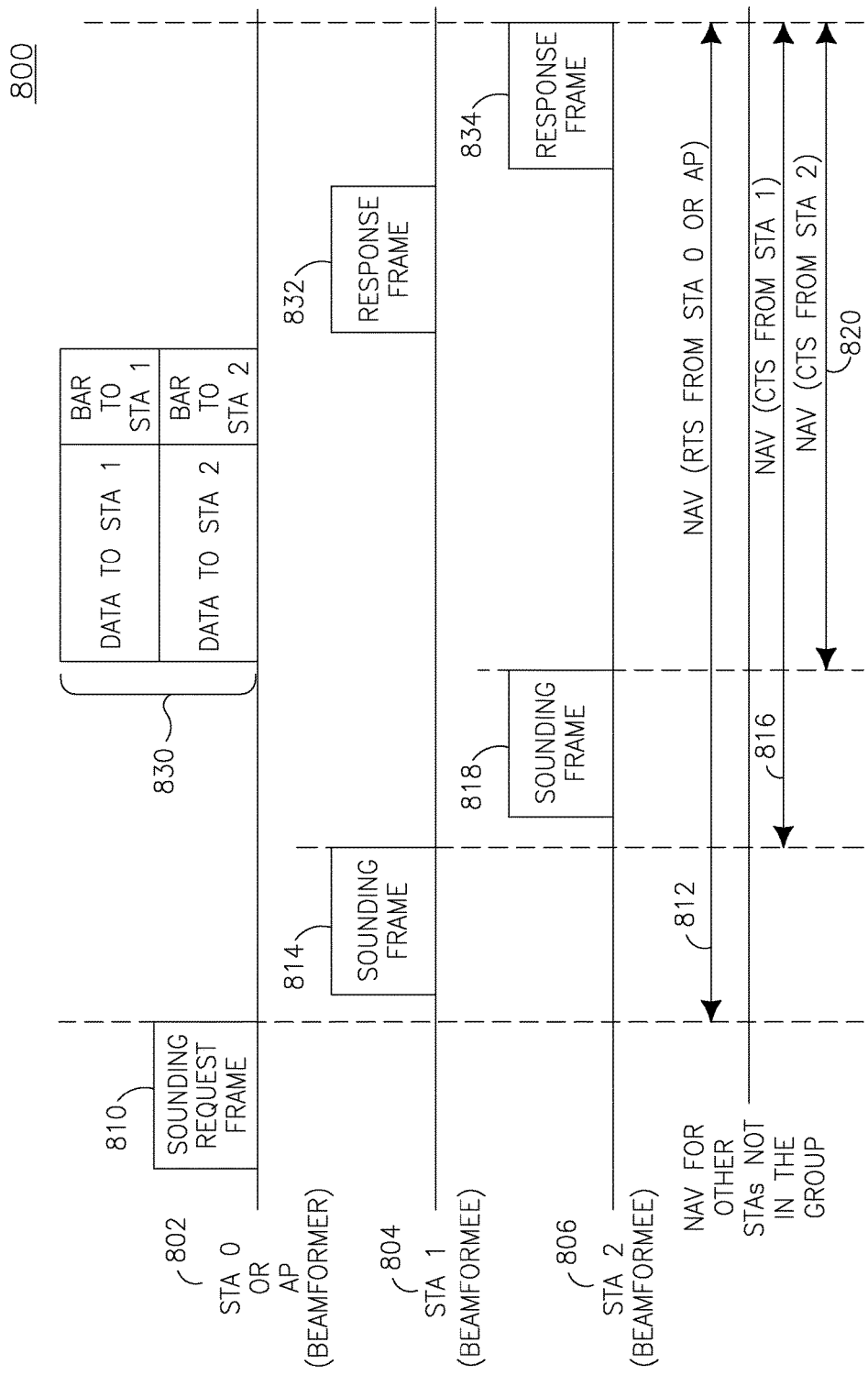
FIG. 8 is a flow diagram of a sounding procedure with implicit feedback for a group frame exchange.

FIG. 8 is a flow diagram of a sounding procedure 800 with implicit feedback for a group frame exchange. The sounding procedure 800 involves an AP or STA0 802 which is the beamformer (referred to hereafter as AP 802), a first station STA1 804, and a second station STA2 806. STA1 804 and STA2 806 are both beamformees. STA1 804 is before STA2 806 in the order associated with the group. It is noted that the procedure 800 will work with any number of stations. While the procedure 800 is described in terms of an AP being the beamformer, this is one example embodiment, and any STA may be the beamformer.

The AP 802 sends a sounding request frame addressed to the group by including the group ID in the RA field (step 810). In one implementation, the sounding request frame may be a RTS frame, and may use a legacy frame format or L-SIG TXOP protection for supporting legacy devices. The sounding request frame may have its RA field include one or more of: the group ID, its individual MAC address, a newly defined address or identifier that is recognizable by all the other devices belonging the group, or an existing address or identifier that is recognizable by the other devices belonging the group.

The sounding request frame may include an indication using one or more bits that requires the beamformee devices associated with the group ID to respond with sounding response frames. In one embodiment, this indication may be in the PHY preamble of the sounding request frame. The sounding request frame may also include the group ID information in either the PHY preamble (e.g., in the VHT-SIG fields) or in MAC layer fields (e.g., in the RA field). In these scenarios, the RA field of the sounding request frame may include a broadcast ID, or a general group ID representing all group transmissions. Also, if the PHY preamble of the sounding request frame is modified, then L-SIG TXOP protection may be used for NAV setting of legacy devices, because the legacy devices may not understand or decode the modified PHY preamble. Alternatively, a legacy format frame (e.g., CTS to self) may be sent before the sounding request frame to set the NAV appropriately.

Any STAs not in the group set their NAV based on the duration field in the sounding request frame (step 812).

STA1 804 responds first with a sounding frame with the RA field containing the group ID (step 814). In one implementation, the sounding frame may be a CTS frame, with one or more bits indicating that it is a sounding frame, training symbols or fields, and L-SIG TXOP protection for supporting legacy devices. The sounding frame from the STA1 804 may be sent at a delay or a SIFS interval or more, depending on the implementation. It is noted that any other interframe spacing interval may be used instead of the SIFS. Any STAs not in the group set their NAV based on the duration field in the sounding frame (step 816), if the new NAV value is longer than the NAV value from the sounding request frame or if a STA receiving the sounding frame from STA1 did not receive the sounding request frame from AP0.

The STA2 806 sends a sounding frame with the RA field containing the group ID (step 818). Similar to the sounding frame sent by STA1 804, the sounding frame sent by STA2 806 may be a CTS frame and include similar information. Any STAs not in the group set their NAV based on the duration field in the sounding frame (step 820), if the new NAV value is longer than the NAV value from the sounding request frame or from the sounding frame from STA1 804 or if a STA receiving the sounding frame from STA2 did not receive the sounding request frame from AP0 or the sounding frame from STA1.

The AP 802 sends a group frame with data and a BAR to STA1 804 and data and a BAR to STA2 806 (step 830). In an OFDMA implementation, the group frame is transmitted to STA1 804 and STA2 806 on their respective allocated frequencies. In a MU-MIMO implementation, the group frame is transmitted to STA1 804 and STA2 806 on the same frequency. Following the same order as with sending the sounding frames, STA1 804 first sends a response frame to the group ID (step 832). Then STA2 806 sends a response frame to the group ID (step 834). The response frame may be a block ACK or other response frame type, depending on the frame exchange protocol used.

As noted above, one embodiment may use a RTS frame as the sounding request frame sent by the beamformer and a CTS frame as the sounding frame sent by the beamformees. The protection mechanism for NAV setting when using the sounding frames needs to take into account legacy devices that cannot understand beyond the legacy portion of the packet. For the sounding request frame, there are three options for the NAV protection mechanism: using the legacy packet format, using the L-SIG TXOP protection as defined in IEEE 802.11n, or using a legacy format frame (e.g., CTS to self) sent before the sounding request frame to set the NAV. For the sounding frame, the L-SIG TXOP protection may be used. Alternatively, a legacy format frame (e.g., CTS to self) may be sent before the sounding frame to set the NAV appropriately.

Sounding with Explicit Feedback for Group Frame Exchange

Sounding with explicit feedback for group transmission may be performed by a beamformer device by sending a sounding frame including training symbols. The sounding frame may include: one or more bits indicating that it is a sounding frame; a request for feedback in the form of sounding response frame from the beamformees in the group; scheduling information for the sounding response frames from the beamformees; or a request for other channel measurements, such as channel quality (e.g., Signal to Noise Ratio) in the sounding response frame from the beamformees in the group.

The sounding frame may use the 802.11n L-SIG TXOP protection, so that all devices (including the legacy devices)

may set their NAV based on the length and rate parameters included in the L-SIG field. Alternatively, a legacy format frame (e.g., CTS to self) may be sent before the sounding request frame to set the NAV appropriately. The group ID information may be included in the PHY preamble of the sounding frame, e.g., the VHT-SIG fields in the PHY preamble, or in the MAC fields of the sounding frame, e.g., the group ID included in the RA field and the order information implicitly or explicitly associated with the group ID.

The sounding frame and the sounding response frame may be any data frame, management frame, or control frame. For example, the sounding frame may be a RTS frame or a CTS frame. The sounding response frame may have its RA field include any one of: the group ID, a special identifier of the beamformer device that is recognizable by all the devices in the group as part of the group ID, or the individual MAC address of the beamformer. The sounding response frame may be used for responding with channel estimates or channel measurements, such as channel quality (e.g., Signal to Noise Ratio).

The order for transmitting sounding response frames may be derived by the beamformee devices in the group from the order information associated with the group ID, or the order information provided by the beamforming device in earlier frames (e.g., the sounding frame). The sounding response frames may be sent immediately or delayed. When sent immediately, the sounding response frame follows the sounding frame from the beamformer at a delay of a SIFS interval (or other interframe spacing interval). When sent delayed, the sounding response frame is sent at a delay of more than a SIFS interval (or other interframe spacing interval) after the sounding frame from the beamformer and may include a time stamp for the channel estimate or measurements.

Figure 9:
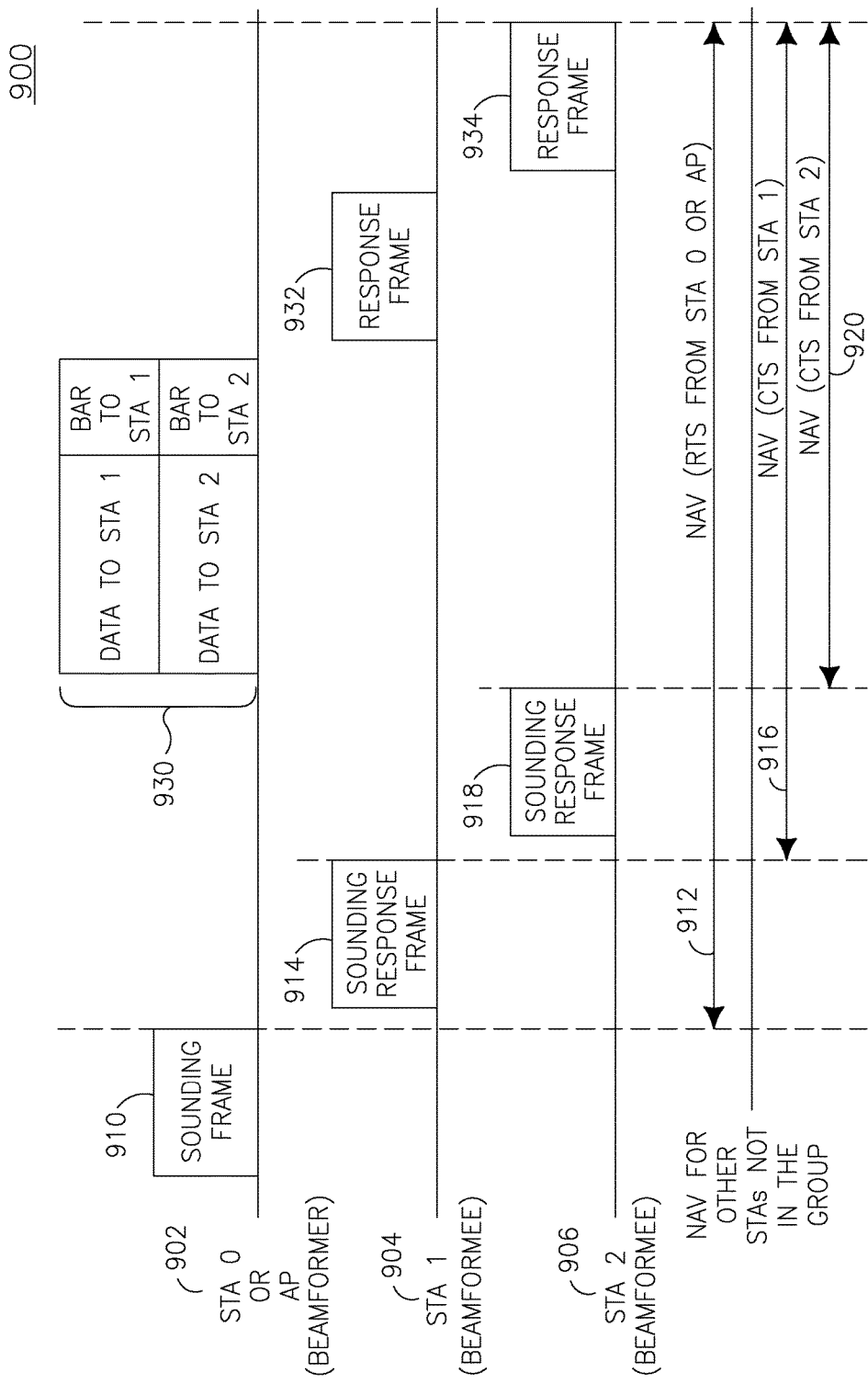
FIG. 9 is a flow diagram of a sounding procedure with explicit feedback for a group frame exchange.

FIG. 9 is a flow diagram of a sounding procedure 900 with explicit feedback for a group frame exchange. The sounding procedure 900 involves an AP or STA0 902 which is the beamformer (referred to hereafter as AP 902), a first station STA1 904, and a second station STA2 906. STA1 904 and STA2 906 are both beamformees. STA1 904 is before STA2 906 in the order associated with the group. It is noted that the procedure 900 will work with any number of stations. While the procedure 800 is described in terms of an AP being the beamformer, this is one example embodiment, and any STA may be the beamformer.

The AP 902 sends a sounding frame addressed to the group by including the group ID in the RA field (step 910). In one implementation, the sounding frame includes one or more bits indicating that it is a sounding frame, training symbols or fields, a request for a sounding response from the beamformees, and L-SIG TXOP protection for supporting legacy devices.

Any STAs not in the group set their NAV based on the duration field in the sounding frame (step 912). STA1 904 responds first with a sounding response frame with the RA field containing the group ID (step 914). In one implementation, the sounding response frame includes a channel estimate and channel measurements. The sounding response frame from the STA1 904 may be sent at a delay or a SIFS interval or more, depending on the implementation. It is noted that any other interframe spacing interval may be used instead of the SIFS. Any STAs not in the group set their NAV based on the duration field in the sounding response frame (step 916), if the new NAV value is longer than the NAV value from the sounding frame or if a STA receiving the sounding response frame from STA1 did not receive the sounding frame from AP0.

The STA2 906 sends a sounding response frame with the RA field containing the group ID (step 918). In one implementation, the sounding response frame includes a channel estimate and channel measurements. Any STAs not in the group set their NAV based on the duration field in the sounding response frame (step 920), if the new NAV value is longer than the NAV value from the sounding frame or from the sounding response frame from STA1 904 or if a STA receiving the sounding response frame from STA2 did not receive the sounding frame from AP0 or the sounding response frame from STA1.

The AP 902 sends a group frame with data and a BAR to STA1 904 and data and a BAR to STA2 906 (step 930). In an OFDMA implementation, the group frame is transmitted to STA1 904 and STA2 906 on their respective allocated frequencies. In a MU-MIMO implementation, the group frame is transmitted to STA1 904 and STA2 906 on the same frequency. Following the same order as with sending the sounding response frames, STA1 904 first sends a response frame to the group ID (step 932). Then STA2 906 sends a response frame to the group ID (step 934). The response frame may be a block ACK or other response frame type, depending on the frame exchange protocol used.

Error Recovery in Sounding for Group Frame Exchange

If a beamformer device sends a sounding request frame or a sounding frame and does not receive one or more expected responses (either a sounding frame if implicit feedback is used or a sounding response from if explicit feedback is used) from the beamformee devices in the group, then there may be an error. The beamformer device may recover from the error by attempting to reclaim the wireless medium or by ignoring the missing response.

The beamformer device may attempt to reclaim the wireless medium as soon as it detects a failure of an expected response, after sensing the channel as idle for a certain duration, e.g., PIFS. The beamformer device may then restart the procedure by sending the sounding request frame or sounding frame, or sending an updated sounding request frame or sounding frame (to account for the failed frame(s)) if time is available before the beginning of the next expected response.

Alternatively, the beamformer device waits for the last response from the group and then attempts to reclaim the wireless medium after sensing the channel as idle for a certain duration, e.g., PIFS. The beamformer device may then restart the procedure by sending the sounding request frame or sounding frame, or sending an updated sounding request frame or sounding frame (to account for the failed frame(s)).

The beamformer device may ignore the failure of an expected response and continue as if the expected response was received.

Special Notes on Preceding Embodiments

The sounding request frame or sounding frame sent by the beamformer device may have its RA field include one of the following: a group identifier, its individual MAC address, a newly defined address or identifier that is recognizable by all of the other devices belonging to the group, or an existing IEEE 802.11 address or identifier that is recognizable by the other devices belonging to the group.

The sounding frames or sounding response frames sent by the beamformee devices may have the RA field include one of the following: a group identifier, a special identifier of the beamformer device that is recognizable by all of the devices in the group as part of the group identifier, or the individual MAC address of the beamformer.

The sounding request frame (implicit feedback) or sounding frame (explicit feedback) from the beamformer may include an indication using one or more bits that requires the beamformees associated with the group ID to respond with sounding frames (implicit feedback) or sounding response frames (explicit feedback). In one embodiment, this indication may be in the PHY preamble of the sounding request frame or sounding frame from the beamformer.

The sounding request frame or sounding frame from the beamformer may include the group ID information in either the PHY preamble or in MAC layer fields. In these scenarios, the RA field of the sounding request frame or sounding frame from the beamformer may include one of the following: a broadcast ID or a general group ID representing all group transmissions (e.g., MU-MIMO or OFDMA). Also, if the PHY preamble of the sounding request frame or sounding frame from the beamformer is modified, then L-SIG TXOP protection as defined in IEEE 802.11n may be used for NAV setting of legacy devices, because the legacy devices may not understand or decode the modified PHY preamble. Alternatively, a legacy format frame (e.g., CTS to self) may be sent before the sounding request frame or sounding frame from the beamformer to set the NAV.

The sounding mechanisms described above may be applied on all bandwidths of operation and all frequency channels of operation, e.g., the primary channel and secondary channels of an 802.11 BSS. For example, the sounding mechanisms may be applied in each bandwidth of operation used by the system or BSS, for example when there are 20 MHz, 40 MHz, and 80 MHz capable devices in operation. Alternatively, if all the devices operating in the system have a common bandwidth (e.g., 20 MHz, 40 MHz, or 80 MHz), then the sounding mechanisms may be carried out in the common bandwidth used by the system or BSS.

The AP and STAs may indicate the capability to support one or more aspects of the sounding mechanisms for group transmissions by using one or more bits. This indication may be included in any frames, for example, in management frames such as association request, association response, re-association request, re-association response, probe request, probe response, beacon, secondary beacon, or auxiliary beacon frames. In one embodiment, the capability indication may be included in a VHT capability information element (e.g., an IEEE 802.11ac VHT capabilities information field) which may be included in any of the above listed frames.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for multi-user (MU) multiple-input multiple output (MIMO) channel sounding by a station (STA), the method comprising:
   receiving, from an access point (AP), sounding information and training symbols; wherein the sounding information includes an indication of a first STA in an order of a group of STAs to transmit feedback;
   receiving, from the AP, a frame addressed to the group of STAs, wherein the frame includes a PHY preamble including a very high throughput signal (VHT-SIG) field, the VHT-SIG field including a group identification (group ID) field; and
   transmitting a first sounding response frame to the AP, wherein the first sounding response frame includes quantized sounding feedback determined from the received training symbols;
   wherein the STA is the first STA in the order of the group of STAs.

2. The method of claim 1, wherein the frame further includes a request for feedback from each STA in the group of STAs.

3. The method of claim 1, wherein the first sounding response frame from the first STA in the group of STAs is transmitted after a short interframe spacing (SIFS) interval delay from the frame.

4. The method of claim 1, wherein the first sounding response frame includes at least one of: a channel estimate based on the received frame or a channel measurement based on the received frame.

5. The method of claim 1, wherein the AP is a very high throughput (VHT) AP.

6. The method of claim 1, wherein each STA in the group of STAs is a very high throughput (VHT) STA.

7. The method of claim 1, wherein the group identification information identifying the group of STAs enables another STA not in the group of STAs, that receives the frame and the first sounding response frame, to set a network allocation vector (NAV) timer based on a duration field in the first sounding response frame on a condition that the duration field in the first sounding response frame is longer than the duration field in the frame.

8. A multi-user (MU) multiple-input multiple output (MIMO) channel sounding station (STA), the STA comprising:
   a processor;
   a memory;
   a receiver configured to receive, from an access point (AP), sounding information and training symbols; wherein the sounding information includes an indication of a first STA in an order of a group of STAs to transmit feedback;
   the receiver further configured to receive, from the AP, a frame addressed to the group of STAs, wherein the frame includes a PHY preamble including a very high throughput signal (VHT-SIG) field, the VHT-SIG field including a group identification (group ID) field; and
   a transmitter configured to transmit, on a condition the STA is the first STA in the order of the group of STAs, a first sounding response frame to the AP, wherein the first sounding response frame includes quantized sounding feedback determined from the received training symbols.

9. The STA of claim 8, wherein the frame further includes a request for feedback from each STA in the group of STAs.

10. The STA of claim 8, wherein the first sounding response frame from the first STA in the group of STAs is transmitted after a short interframe spacing (SIFS) interval delay from the frame.

11. The STA of claim 8, wherein the first sounding response frame includes at least one of: a channel estimate based on the received frame or a channel measurement based on the received frame.

12. The STA of claim 8, wherein the AP is a very high throughput (VHT) AP.

13. The STA of claim 8, wherein each STA in the group of STAs is a very high throughput (VHT) STA.

14. The STA of claim 8, wherein the group identification information identifying the group of STAs enables another STA not in the group of STAs, that receives the frame and the first sounding response frame, to set a network allocation vector (NAV) timer based on a duration field in the first sounding response frame on a condition that the duration field in the first sounding response frame is longer than the duration filed in the frame.

15. A multi-user (MU) multiple-input multiple output (MIMO) station (STA), the STA comprising:

a receiver configured to receive, from an access point (AP), a management frame comprising: a group identifier (group ID) corresponding to a group of STAs and an indication of an order of the STA within the group;

the receiver further configured to receive, from the AP, an MU frame with a PHY preamble comprising a very high throughput signal (VHT-SIG) field, the VHT-SIG field including the group ID; and a processor and memory configured to process data in accordance with the order of the STA within the group.

16. The STA of claim 15, wherein the processor is further configured to measure at least one symbol of the MU frame.

17. The STA of claim 16, wherein the processor is further configured to measure channel quality.

18. The STA of claim 16, wherein the processor is further configured to measure signal to noise ratio.

* * * * *